(12) United States Patent
Hattori

(10) Patent No.: US 6,448,903 B1
(45) Date of Patent: Sep. 10, 2002

(54) DEVICE FOR DETECTING INTERNAL PRESSURE OF AIR-FILLED GUNWALE PROTECTOR

(75) Inventor: Yutaka Hattori, Hiratsuka (JP)

(73) Assignee: The Yokohama Rubber Co., Ltd., Tokyo (JP)

( * ) Notice: Subject to any disclaimer, the term of this patent is extended or adjusted under 35 U.S.C. 154(b) by 0 days.

(21) Appl. No.: 09/341,115

(22) PCT Filed: Nov. 25, 1997

(86) PCT No.: PCT/JP97/04296

§ 371 (c)(1),
(2), (4) Date: Aug. 23, 1999

(87) PCT Pub. No.: WO99/27339

PCT Pub. Date: Jun. 3, 1999

(30) Foreign Application Priority Data

May 27, 1996 (JP) .............................................. 8-132029

(51) Int. Cl.$^7$ ............................................. G08C 19/16
(52) U.S. Cl. ........................... 340/870.01; 340/870.07; 340/539; 340/10.32; 340/10.34; 342/42; 342/44; 114/219; 441/11
(58) Field of Search ....................... 340/870.01, 870.06, 340/870.07, 539, 870.11, 10.32, 10.34; 342/51, 42, 44; 114/219, 212; 441/211

(56) References Cited

U.S. PATENT DOCUMENTS

| | | | | |
|---|---|---|---|---|
| 5,053,774 A | * | 10/1991 | Schuermann et al. | 340/10.34 |
| 5,294,931 A | * | 3/1994 | Meier | 342/44 |
| 5,355,137 A | * | 10/1994 | Schurmann | 342/42 |
| 5,410,315 A | * | 4/1995 | Huber | 340/10.3 |
| 5,451,959 A | * | 9/1995 | Schuermann | 342/44 |
| 5,461,385 A | * | 10/1995 | Armstrong | 340/10.41 |
| 5,491,468 A | * | 2/1996 | Everett et al. | 340/10.34 |
| 5,500,651 A | * | 3/1996 | Schuermann | 340/10.3 |
| 5,541,604 A | * | 7/1996 | Meier | 342/42 |
| 5,602,538 A | * | 2/1997 | Orthmann et al. | 340/10.2 |
| 5,642,103 A | * | 6/1997 | Tokuda et al. | 235/380 |
| 5,793,324 A | * | 8/1998 | Aslanidis et al. | 342/42 |

FOREIGN PATENT DOCUMENTS

JP 60-46438 * 3/1985

* cited by examiner

Primary Examiner—Michael Horabik
Assistant Examiner—Albert K. Wong
(74) Attorney, Agent, or Firm—Rader, Fishman & Grauer, PLLC

(57) ABSTRACT

The present invention relates to an internal-pressure detection apparatus for a pneumatic fender that can reduce the labor of maintenance. The internal-pressure detection apparatus is configured of an internal-pressure detection unit 10 provided in a pneumatic fender that is fixed to an underwater structure such as a quay 2 and bridge pier 3 or floated and is used as cushioning material for a ship or the like, and a monitor unit 20 provided in an internal-pressure monitoring station 4 on land. The internal-pressure detection unit 10 is driven by the energy of an electromagnetic wave having a first frequency, and detects internal air pressure of the pneumatic fender 1; transmits this air pressure information by an electromagnetic wave having a second frequency. The monitor unit 20 not only transmits the electromagnetic wave, having the first frequency, at the time of internal air pressure detection, but also receives the electromagnetic wave having the second frequency, and obtains the air pressure information transmitted from the internal-pressure detection unit 10; informs a monitoring person of this air pressure information with displaying the air pressure information on a display unit or the like. Thereby, it is possible to easily install the internal-pressure detection apparatus and to reduce the labor of maintenance for battery change or the like.

3 Claims, 6 Drawing Sheets

DEVICE FOR DETECTING INTERNAL PRESSURE OF AIR-FILLED GUNWALE PROTECTOR

TECHNICAL FIELD

The present invention relates to an internal-pressure detect ion apparatus for a pneumatic fender.

BACKGROUND ART

Conventionally, in order to prevent a ship from contacting to or being damaged due to collision within underwater structure such as a bridge pier and a quay, contact of the ship to the underwater structure is prevented by fixing pneumatic fenders to the underwater structure or floating pneumatic fenders on the water.

Such a pneumatic fender is made as cushioning material fill ed with air inside the pneumatic fender, and hence, if its air pressure decreases due to leakage of internal air, its function is impaired. For this reason, the internal air pressure is kept at a designated value by measuring the air pressure inside the fender through periodical patrol and supplementing the fender, whose internal air pressure is decreased, with air.

Nevertheless, since it requires much labor to check the air pressure inside the fender by manual patrol, systems monitoring the air pressure of the fender by using cables (Japanese Utility Model Application No. 61-112243) or a radio wave (Japanese Patent Application Laid-Open No. 60-46438) are also used.

Nevertheless, in a system monitoring air pressure of each fender using cables as disclosed in the Japanese Utility Model Application No. 61-112243, it was necessary to connect each fender to a monitoring station with a hose, and hence it needed not only much labor to install the system, but also much time to maintain the system itself.

In addition, in a system monitoring air pressure inside a fender using a radio wave as disclosed in Japanese Patent Application No. 60-46438, a battery has been used in a transmitter (radio wave transmitter) provided in the fender. Therefore, in order to prevent the transmitter from stopping operation, it was necessary to periodically replace this battery. Hence, although installation of the system has been comparatively easy, this system has been a problem that it requires much labor to maintain the system.

An object of the present invention is, in consideration of above problems, to provide an internal-pressure detection apparatus for a pneumatic fender that can reduce the labor of installation and maintenance.

DISCLOSURE OF THE INVENTION

In order to attain the object described above, the present invention provides not only an internal-pressure detection unit in a pneumatic fender that is fixed to an underwater structure or floated and is used as cushioning material for a ship or the like, but also a monitor unit in an internal-pressure monitoring station Furthermore, the present invention transfers an air pressure value inside the pneumatic fender, which is detected by the internal-pressure detection unit, to the monitor unit by an electromagnetic wave, and thereby makes it possible to monitor internal air pressure of all the pneumatic fenders, which are objects to be monitored, in the internal-pressure monitoring station.

The internal-pressure detection unit described above converts the energy of an electromagnetic wave having a first frequency, which is received by means of reception, into electric energy, and thereby operates by this converted electric energy. Furthermore, the internal-pressure detection unit detects the air pressure inside a pneumatic fender by a pneumatic sensor, and transmits this detection result by an electromagnetic wave having a second frequency.

On the other hand, the monitor unit described above not only supplies operation energy to the internal-pressure detection unit by transmitting the electromagnetic wave, having the first frequency by means of transmission, but also informs of a detection result of the air pressure by receiving the electromagnetic wave having the second frequency that is transmitted from the internal-pressure detection unit.

For example, the internal-pressure detection unit described above comprises a pneumatic sensor that detects air pressure inside a pneumatic fender and outputs an electric signal corresponding to the air pressure value, means of reception for receiving an electromagnetic wave having a first frequency, means of energy conversion for converting the energy of the electromagnetic wave, received by the means of reception, into electric energy, and means of transmission for operating by this converted electric energy, inputting an electric signal outputted from the pneumatic sensor, and transmitting a detection result of the air pressure by an electromagnetic wave having a second frequency.

In addition, the monitor unit described above comprises means of transmission for transmitting the electromagnetic wave having the; first frequency, means of reception for receiving the electromagnetic wave having the second frequency and converting the electromagnetic wave into an electric signal, means of detection result extraction for extracting the detection result of the air pressure, which is included in the electric signal outputted from the means of reception, and means of information for informing of the detection result extracted According to the internal-pressure detection apparatus for a pneumatic fender that has the configuration described above, in the internal-pressure detection unit, the electromagnetic wave having the first frequency that is transmitted from the monitor unit is received by the means of reception. Furthermore, the energy of this electromagnetic wave is converted into electric energy by the means of energy conversion, and is supplied to the pneumatic sensor and the means of transmission.

Thereby, the internal-pressure detection unit operates by the energy of the electromagnetic wave having the first frequency received and hence it is unnecessary to provide any power supply such as a storage cell. Hence, it is unnecessary to periodically replace the storage cell, and hence it is possible to omit the labor of maintenance.

Furthermore, the air pressure of the pneumatic fender is detected by the pneumatic sensor in the internal-pressure detection unit, and an electric signal corresponding to the air pressure value detected is outputted from the pneumatic sensor. This electric signal is inputted to the means of transmission, and the detection result of the air pressure is transmitted by the electromagnetic wave having the second frequency.

On the other hand, in the monitor unit, the electromagnetic wave having the first frequency is transmitted by the means of transmission at the time of detecting the air pressure, and the electromagnetic wave having the second frequency that is transmitted from the internal-pressure detection unit is received by the means of reception and is converted into an electric signal.

The detection result of the air pressure that is included in the electric signal outputted from the means of reception is extracted by the means of detection result extraction, and then this detection result extracted is informed by the means of information.

Therefore, it is unnecessary to install cables between the pneumatic fender and monitoring station, and hence it is possible to omit the labor of installing cables like the conventional example.

In addition, by not only providing, in the internal-pressure detection unit, means of identification-information memory for storing the identification-information inherent in each internal-pressure detection unit, and means of transmission for transmitting this identification-information and the detection result of the air pressure by the electromagnetic wave having the second frequency, but also providing, in the monitor unit, means of detection result extraction for extracting the detection result of the air pressure and identification-information from the electric signal outputted from the means of reception, and means of information for informing of the extracted identification-information and detection result in a one-to-one correspondence between them, it becomes possible to identify the detection result transmitted from the internal-pressure detection unit mounted to each pneumatic fender if there are a plurality of pneumatic fenders that are objects to be managed.

That is, the identification-information inherent in each internal-pressure detection unit is stored in the means of identification-information memory, and the detection result of the air pressure and the identification-information are transmitted by the means of transmission in the internal-pressure detection unit by the electromagnetic wave having the second frequency.

Furthermore, in the monitor unit, the detection result of the air pressure and the identification-information are extracted by the means of detection result extraction, and then the means of information informs a monitoring person of this extracted identification-information and detection result in a one-to-one correspondence between them.

Thereby, when each detection result of the plurality of internal-pressure detection units is monitored at one monitor unit, the internal-pressure detection result of each pneumatic fender can be identified on the basis of the identification-information.

In addition, by providing, in the internal-pressure detection unit, means of identification-information extraction for extracting identification-information included in a high-frequency signal received by the means of reception, means of identification-information matching decision for deciding matching this identification-information extracted to own identification-information stored in the means of identification-information memory, and the means of transmission drive control for driving the means of transmission when matching according to this decision result, and providing, in the monitor unit, the means of memory for storing the identification-information of internal-pressure detection units provided in the pneumatic fenders that are objects to be detected, and means of transmission for transmitting this stored identification-information, which is stored, by the electromagnetic wave having first frequency, it becomes possible to obtain the detection result of the air pressure by designating one from among the plurality of pneumatic fenders that are objects to be managed.

That is, at the time of detecting the air pressure, in the monitor unit, the identification-information, which is stored in the means of memory, of the internal-pressure detection unit provided in the pneumatic fender that is an object to be detected is transmitted by the means of transmission by the electromagnetic wave having the first frequency.

Furthermore, in the internal-pressure detection unit, the identification-information included in the high-frequency signal received by the means of reception is extracted by the means of identification-information extraction. Matching this identification-information extracted to the own identification-information stored in the means of identification-information memory is decided by means of the identification-information matching decision. Then, when matching according to this decision result, the means of transmission is driven by the means of transmission drive control, and the own identification-information and detection result of the air pressure are transmitted.

Thereby, if there are a plurality of pneumatic fenders that are objects to be managed or there are a plurality of internal-pressure detection units, it becomes possible to transmit the detection result by designating an arbitrary internal-pressure detection unit.

In addition, by not only providing, in the internal-pressure detection unit, means of instruction extraction for extracting an information-read instruction and an information-write instruction which are included in the high-frequency signal received by the means of reception, means of identification-information matching decision for deciding matching the identification-information extracted by the means of identification-information extraction to the identification-information stored in the means of identification-information memory, means of information memory, the means of information write for writing information, which is an object to be written and follows an information-write instruction, into the means of information memory when matching according to the decision result of means of the identification-information matching decision and receiving the information-write instruction, the means of information read for reading information, which is stored in the means of information memory, when matching according to the decision result of means of the identification-information matching decision and receiving the information-read instruction, and means of transmission for transmitting this information which is read by the electromagnetic wave having the second frequency, but also providing, in the monitor unit, the means of instruction input for inputting an information-write instruction and information, which is an object to be written, to the means of information memory in the internal-pressure detection unit, and an information-read instruction from the means of information memory, the means of information extraction for extracting the information that is stored in the internal-pressure detection unit and is included in the electric signal outputted from the means of reception, means of transmission for transmitting the instructions and information, which are inputted by the means of instruction input, by the electromagnetic wave having the first frequency, and mean's of information for informing a monitoring person of the information extracted by the means of information extraction, it becomes possible to allow a pneumatic fender itself to store and hold information such as maintenance records by recording the information, being inherent in each pneumatic fender, in the means of information memory of the internal-pressure detection unit, and to access this information according to necessity.

That is, if the information-write instruction or information-read instruction is inputted by the means of instruction input in the monitor unit, these instructions are transmitted by the means of transmission by the electromagnetic wave having the first frequency.

The instructions transmitted from the monitor unit by the electromagnetic wave having the first frequency are received by the means of reception in the internal-pressure detection unit. These information-read instruction and information-write instruction, which are included in the high-frequency signal received, are extracted by the means of instruction extraction in the internal-pressure detection unit.

Furthermore, in the internal-pressure detection unit, matching the identification-information, which is extracted by the means of identification-information extraction, to the own identification-information stored in the means of identification-information memory is decided by means of the identification-information matching decision. When matching according to the decision result and receiving the information-write instruction, information that is an object to be written and follows this information-write instruction is written into the means of information memory by the means of information write.

In addition, when matching according to the decision result, of means of the identification-information matching decision and receiving the information-read instruction, information that is stored in the means of information memory is read by the means of information read at the internal-pressure detection unit. This information read is transmitted by the means of transmission by the electromagnetic wave having the second frequency.

Furthermore, the information transmitted from the internal-pressure detection unit is received by the monitor unit, and is informed by the means of information.

Thereby, it becomes possible to access information in the means of information memory of the internal-pressure detection unit as the need arises.

BEST MODE FOR CARRYING OUT THE INVENTION

Hereinafter, an embodiment of the present invention will be described with reference to drawings.

Figure 1:
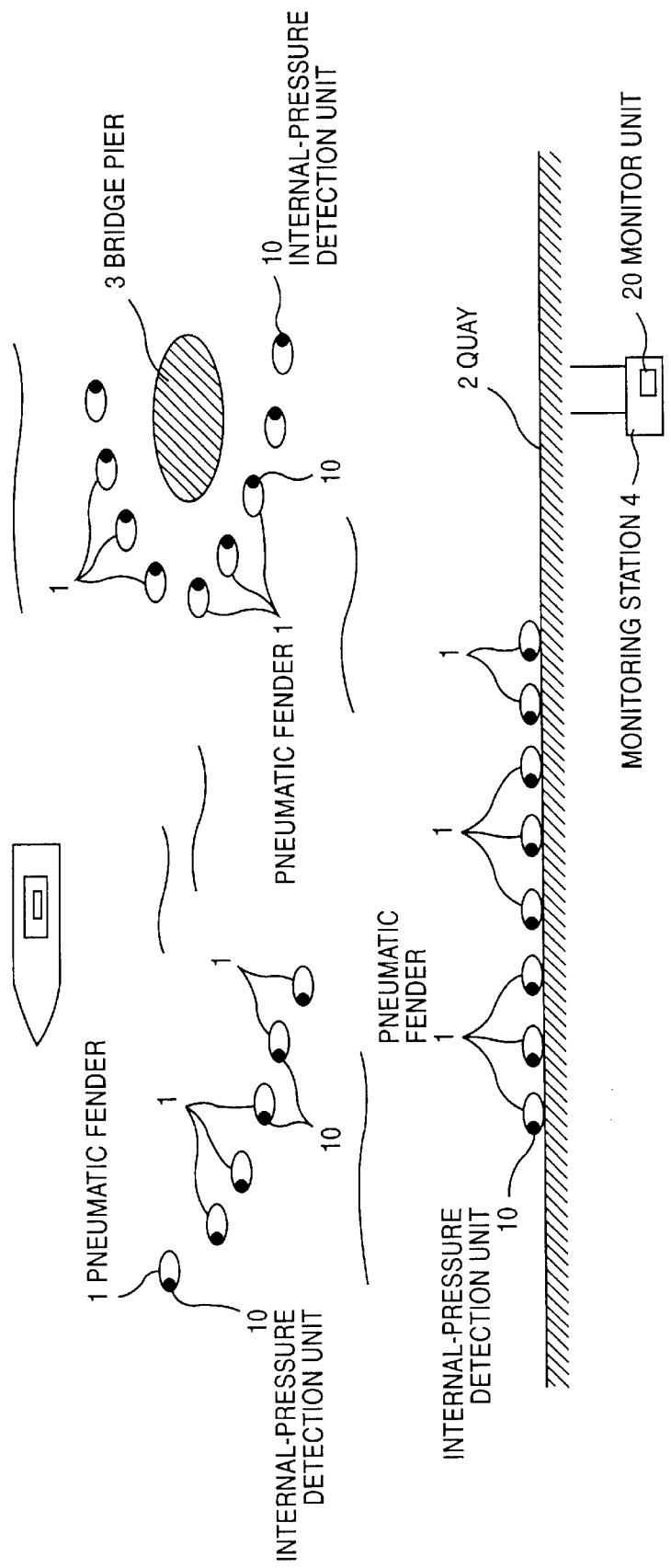
FIG. 1 is a drawing for explaining the configuration of an internal-pressure detection apparatus for a pneumatic fender in an embodiment of the present invention.

FIG. 1 is a drawing for explaining the configuration of an internal-pressure detection apparatus for a pneumatic fender in a first embodiment of the present invention. In the drawing, reference numeral 1 is a pneumatic fender (hereinafter, this is simply called a fender), which is used as cushioning material for a ship or the like with being fixed to an underwater structure such as a quay 2 and bridge pier 3 or being floated on the water. Reference numeral 4 is an internal-pressure monitoring station (hereinafter, this is simply called a monitoring station) provided on land, which monitors air pressure inside each fender 1.

Figure 2:
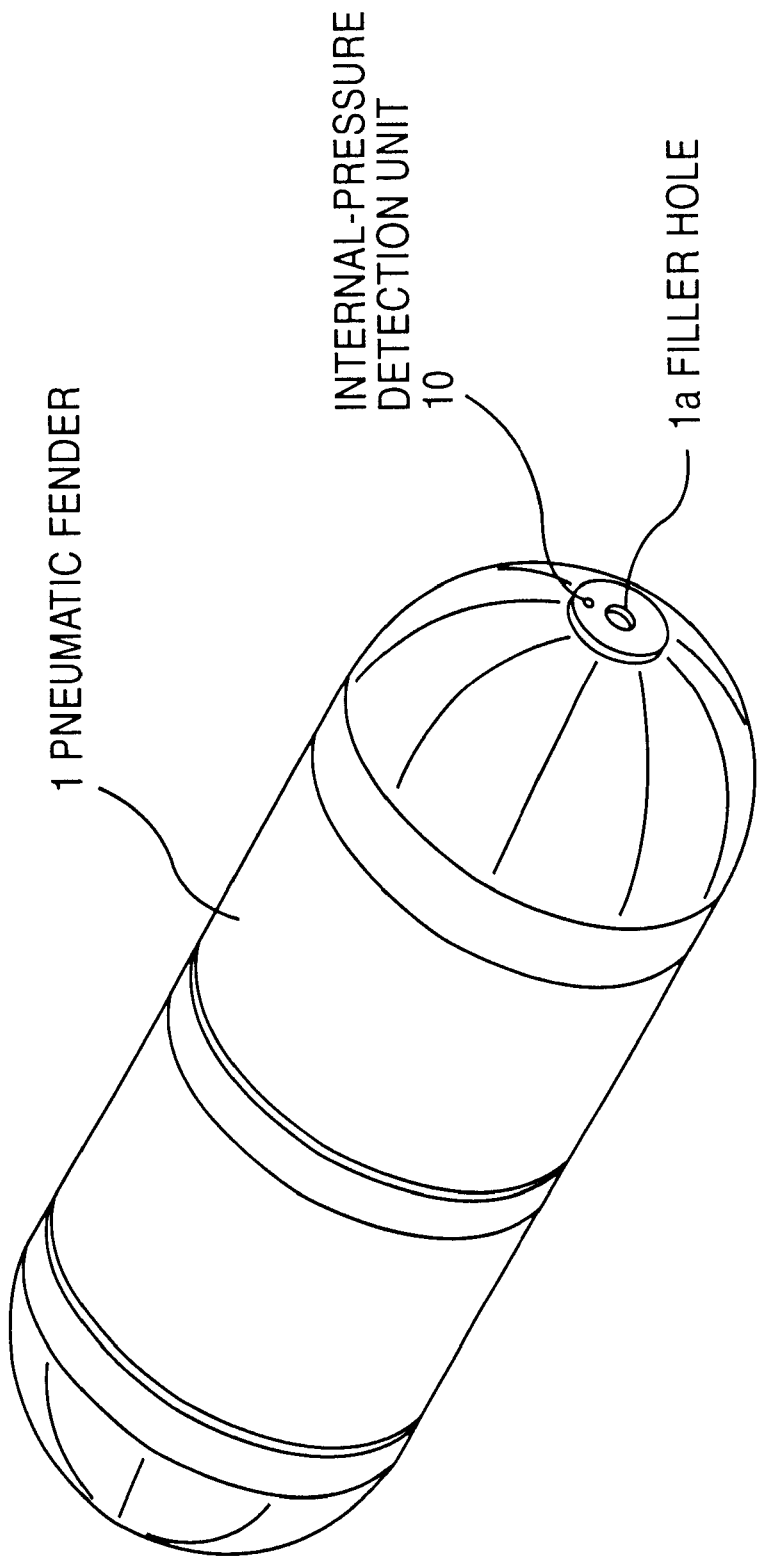
FIG. 2 is an outside drawing showing the pneumatic fender in an embodiment of the present invention.

The pneumatic fender 1, as shown in FIG. 2, has a barrel-like shape obtained by sealing both ends of a rubber tube that is approx. 1–2 m in diameter and approx. 3–4 m long, and has a filler hole 1a of air in an end; the inside is filled with air of the predetermined internal pressure through this filler hole 1a. Furthermore, an internal-pressure detection unit 10, which detects air pressure inside the fender and transmits this information by an electromagnetic wave, is provided in the proximity to the filler hole 1a.

Internal-pressure information (air pressure information inside the fender 1) transmitted from the internal-pressure detection unit 10 is received by the monitor unit 20 provided in the internal-pressure monitoring station 4, the internal air pressure of each fender 1 is monitored by a monitoring person, and air supplement to and maintenance of the fender 1 is performed on the basis of this.

Figure 3:
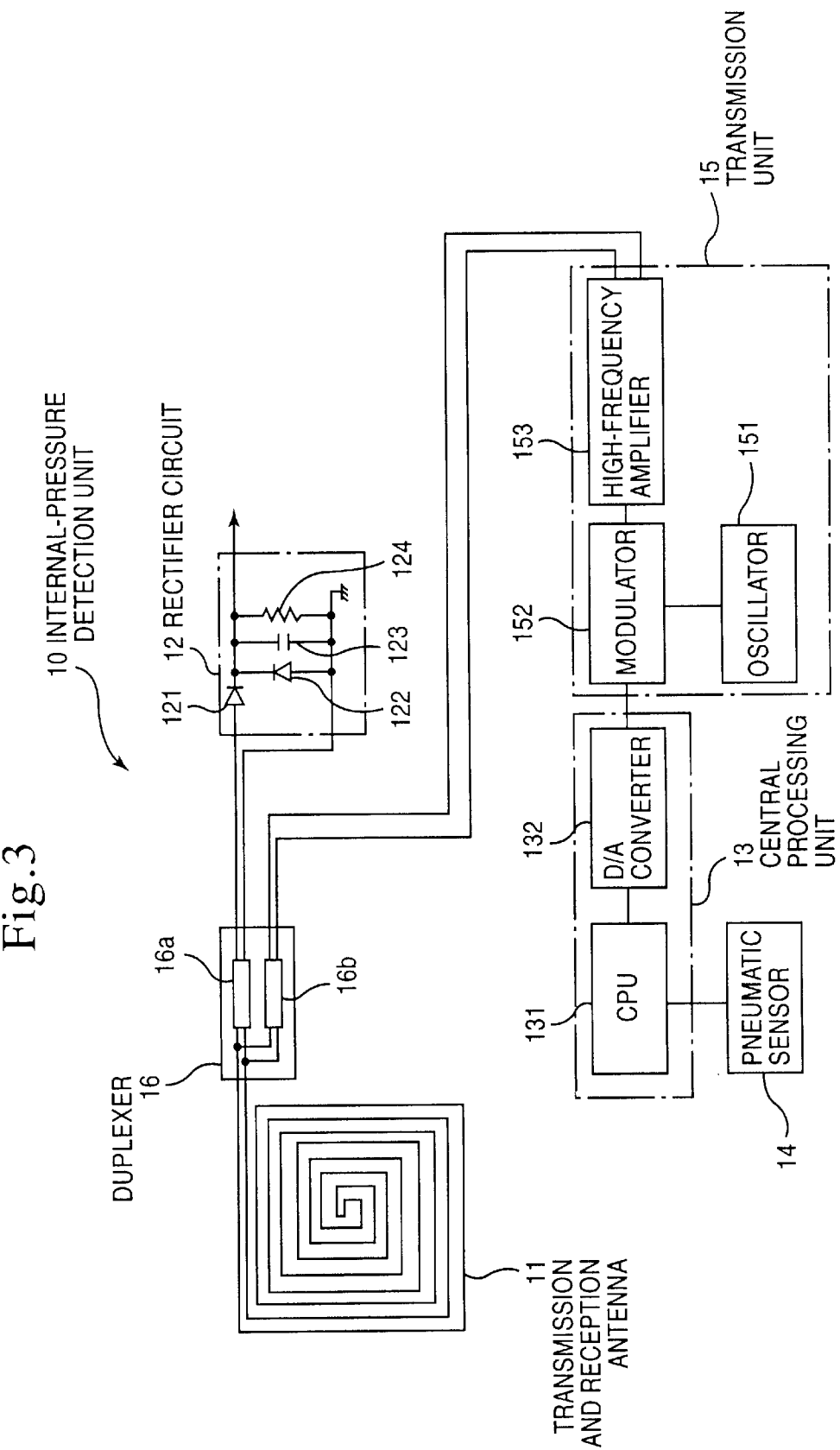
FIG. 3 is a block diagram showing an electric circuit of an internal-pressure detection unit in a first embodiment of the present invention.

FIG. 3 is a block diagram showing an electric circuit of the internal-pressure detection unit 10. In the drawing, 10 is the internal-pressure detection unit, which is configured of a transmission and reception antenna 11, a rectifier circuit 1, a central processing unit 13, a pneumatic sensor 14, a transmission unit 15, and a duplexer 16.

The rectifier circuit 12 is configured of diodes 121 and 122, a capacitor 123, and a resister 124, and forms a known full-wave rectifier circuit. The transmission and reception antenna 11 is connected to the input side of this rectifier circuit 12 through the duplexer 16, and this rectifier circuit 12 outputs rectified current as a driving power supply of the central processing unit 13, pneumatic sensor unit 14, and transmission unit 15 by rectifying high-frequency current, which is induced in the transmission and reception antenna 11 and passes through the duplexer 16, and converting the induced current into direct current.

The central processing unit 13 is configured of a known CPU 131, and a digital/analog (hereinafter, this is called D/A) converter 132 that operate with a preset program.

When electric power is supplied from the rectifier circuit 12 to the CPU 131 and the CPU 131 becomes operable, the CPU 131 converts an analog signal, which is outputted from the pneumatic sensor 14, into digital data and outputs the information of air pressure inside; the fender 1, which is based on this data, to the transmission unit 15 through the D/A converter 132.

The pneumatic sensor 14 is configured of, for example, a capacitance type pressure sensor, a semiconductor pressure sensor, a piezoelectric pressure sensor, or the like, and outputs an analog electric signal corresponding to the air pressure inside the fender The transmission unit 15 is configured of an oscillator 151, a modulator 152, and a high-frequency amplifier 153.

The oscillator 151 generates a carrier wave having a frequency of, for example, 300 MHz. The carrier wave outputted from the oscillator 151 is modulated by the modulator 152 on the basis of an information signal inputted from the central processing unit 13 and is outputted. Furthermore, this carrier wave modulated is supplied to the transmission and reception antenna 11 through the high-frequency amplifier 153 and duplexer 16. Thereby, an electromagnetic wave having a frequency of 300 MHz is radiated from the transmission and reception antenna 11.

The duplexer 16 is configured of a low-pass filter 16a and a high-pass filter 16b, the low-pass filter 16a is connected between the transmission and reception antenna 11 and rectifier circuit 12; and the high-pass filter 16b is connected between the transmission, and reception antenna 11 and high-frequency amplifier 153.

Here, the duplexer 16 achieves separation between a High-frequency signal, having a first frequency (100–300

KHz), and a high-frequency signal having a second frequency (300 MHz). For example, the low-pass filter 16a is a filter passing a high-frequency signal at 1 MHz or lower, and the high-pass filter 16b is a filter passing a high-frequency signal at 100 MHz or higher.

Figure 4:
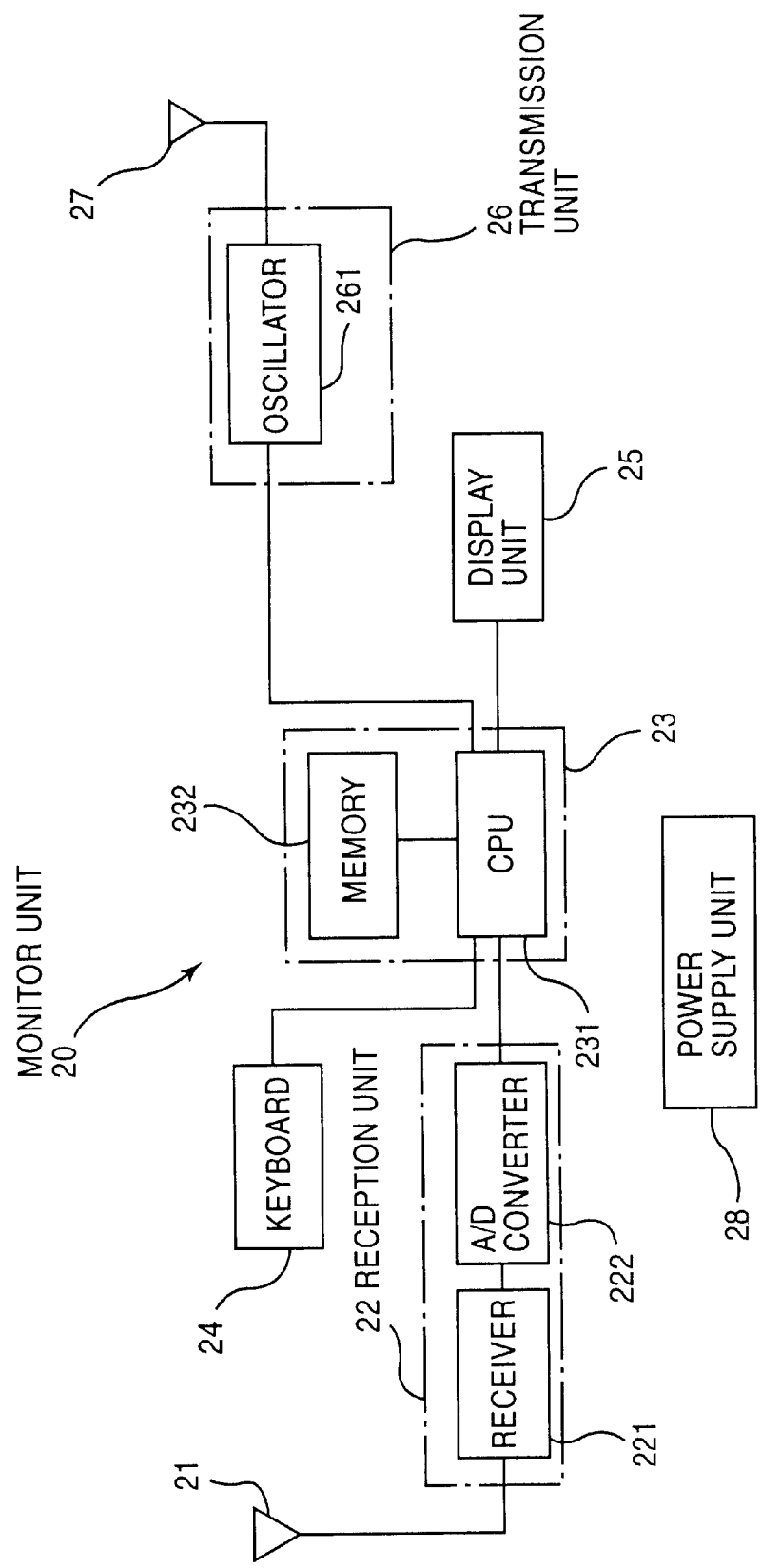
FIG. 4 is a block diagram showing an electric circuit of a monitor unit in the first embodiment of the present invention.

FIG. 4 is a block diagram showing an electric circuit of the monitor unit 20. In the drawing, 20 is the monitor unit, which is configured of a reception antenna 21, a reception unit 22, a central processing unit 23, a keyboard 24, a display unit 25, a transmission unit 26, a transmission antenna 27, and a power supply unit 28 supplying power to them.

Here, the monitor unit 20 in the embodiment is a unit monitoring information such as air pressure information, which is transmitted from the internal-pressure detection unit 10, by receiving the electromagnetic wave having the second frequency (300 MHz) that is radiated from the internal-pressure detection unit 10 while radiating the electromagnetic wave having the first frequency (100–300 KHz) to the internal-pressure detection unit 10 as described later.

In addition, the reception unit 22 in the monitor unit 2 is configured of a receiver 221 and an analog/digital (hereinafter, this is called A/D) converter 222. The input side of the receiver 221 is connected to the reception antenna 21, receives a 300-MHz high-frequency wave, detects this, and thereafter outputs the detected output to the central processing unit 23 through the A/D converter 222.

The central processing unit 23 is configured of a known CPU 231 and memory 232 that operate with a preset program, and, on the basis of an instruction inputted from the keyboard 24, the CPU 231 not only stores information, inputted from the reception unit 22, in the memory 232, but also displays the information on the display unit 25.

In addition, a transmission unit 26 is configured of a transmitter 261, and the transmitter 261 outputs a high-frequency signal at, for example, 100–300 KHz to the transmission antenna 27 on the basis of a control signal from the CPU 231.

According to this embodiment having the configuration described above, the transmission unit 26 is driven at predetermined intervals on the basis of an operating program in the CPU 231 from the monitor unit 20, the high-frequency signal of the first frequency or the high-frequency signal at 100–300 KHz is radiated from the transmission antenna 27.

This electromagnetic wave is inputted to the transmission and reception antenna 11 of the internal-pressure detection unit 10, and induces high-frequency current in the transmission and reception antenna 11. The high-frequency current induced in the transmission and reception antenna 11 is inputted to the rectifier circuit 12 through the low-pass filter 16a.

The high-frequency current inputted to the rectifier circuit 12 is rectified and supplied to the central processing unit 13, pneumatic sensor 14, and transmission unit 15 inside the internal-pressure detection unit 10 as a power source.

Thereby, the central processing unit 13, to which the electric power is supplied while the electromagnetic wave transmitted from the monitor unit 20 is received, performs information transmission processing programmed beforehand. That is, the central processing unit 13 outputs the air pressure information, based on a signal outputted from inside the pneumatic sensor 14, to the transmission unit 15.

The transmission unit 15 modulates a carrier wave on the basis of the information inputted from the central processing unit 13, and supplies the modulated carrier wave or a high-frequency signal to the transmission and reception antenna 11. Thereby, an electromagetic wave of the second frequency or an electromagnetic wave having the frequency of 300 MHz is radiated from the transmission and reception antenna 11.

The monitor unit 20 receives the electromagnetic wave at 300 MHz, which is radiated from the internal-pressure detection unit 10, by the reception unit 22 through the reception antenna 21, and the reception unit 22 converts the information, which is received, into digital data by the A/D converter 222, and transmits the digital data to the central processing unit 23.

The central processing unit 23 displays the information, which is based on the digital data and is inputted from the A/D converter 222, or the air pressure information, which is received from, the internal-pressure detection unit 10, on the display unit 25.

Thereby, it is possible to easily grasp the information of internal air pressure of the fender 1 provided separately from the monitoring station 4 while staying at the monitoring station 4 without performing any periodical patrol as conventional ways.

As described above, according to this embodiment, it is unnecessary to provide a power supply in the internal-pressure detection unit 10, and hence the internal-pressure detection unlit 10 can be semipermanently used. Therefore, since it is unnecessary to periodically replace a battery as conventional ways, it is possible to greatly reduce the labor of maintenance. Furthermore, according to this embodiment, since the detection result is transmitted to the monitor unit by the electromagnetic wave having the second frequency, it is unnecessary to install cables between the fender 1 and monitoring station 4 as conventional ways, and hence it is possible to omit the labor of installing the cables.

Next, a second embodiment of the present invention will be described.

Figure 5:
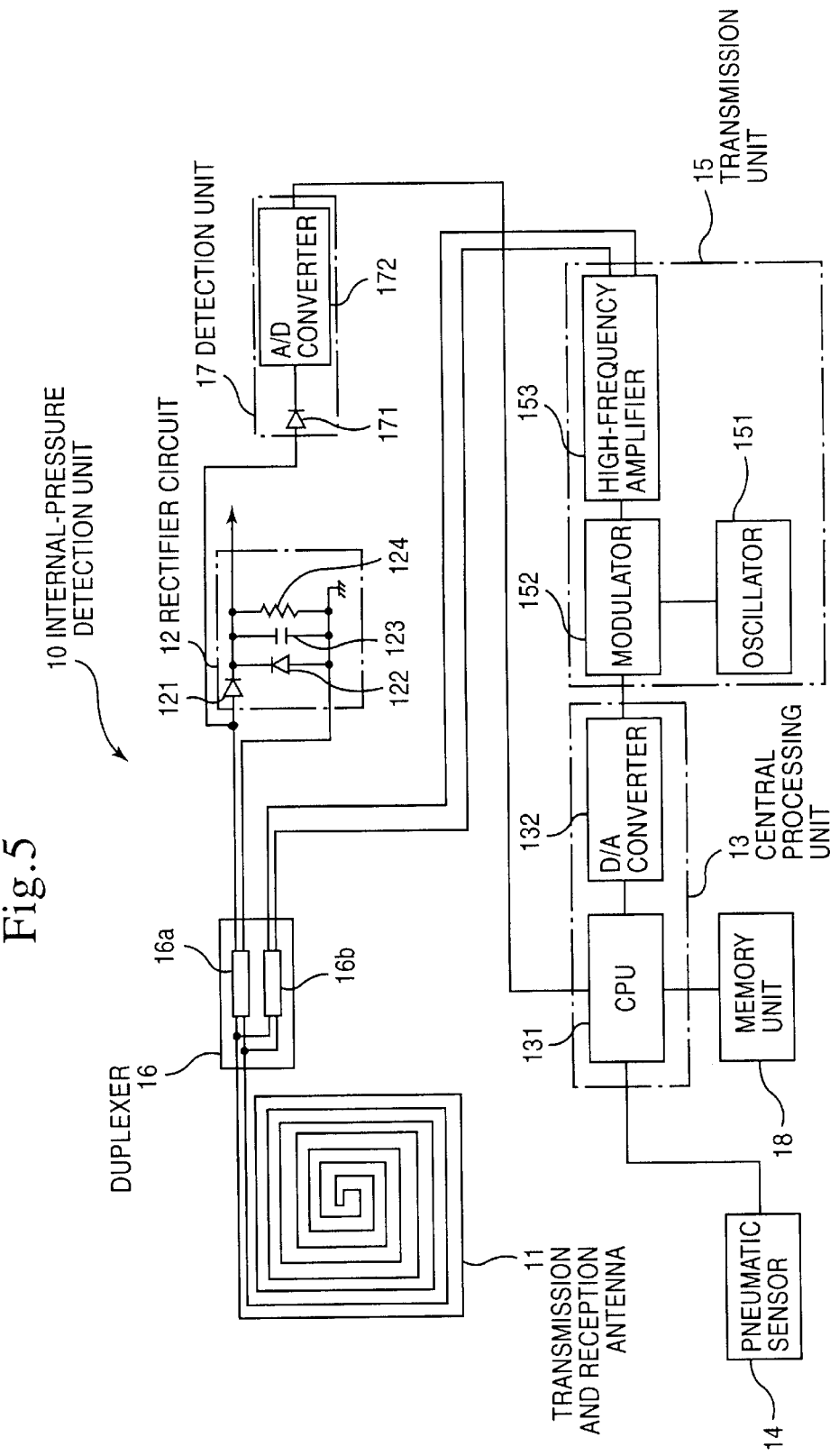
FIG. 5 is a block diagram showing an electric circuit of an internal-pressure detection unit in a second embodiment of the present invention.

FIG. 5 is a block diagram showing an electric circuit of an internal-pressure detection unit 10 in the second embodiment. In the drawing, the same components as those in the first embodiment are shown by the same symbols, and description thereof is omitted. In addition, a difference between the first and second embodiments is that a detection unit 17 and a memory unit 18 are provided in the internal-pressure detection unit 10.

That is, the detection unit 17 is configured of a diode 171 and an A/D converter 172, and the anode of the diode 171 is connected to the transmission and reception antenna 11 through the low-pass filter 16a; and the cathode is connected to the CPU 131 of the central processing unit 13 through the A/D converter 172.

The memory unit 18 is configured of nonvolatile semiconductor memory such as EEPROM connected to the CPU 131, and an identification-information inherent in each fender 1 (each internal-pressure detection unit 10) is stored beforehand in this memory unit 18.

According to this embodiment having the configuration described above, the transmission unit 26 is driven at predetermined intervals on the basis of an operating program in the CPU 231 from the monitor unit 20, and the high-frequency signal of the first frequency or the high-frequency signal at 100–300 KHz is radiated from the transmission antenna 27.

This electromagnetic wave is inputted to the transmission and reception antenna 11 of the internal-pressure detection unit 10, and induces high-frequency current in the transmission and reception antenna 11. The high-frequency current induced in the transmission and reception antenna 11 passes through the low-pass filter 16a, and is then rectified by the rectifier circuit 12 to be supplied to the central processing unit 13, pneumatic sensor 14, and transmission unit 15 inside the internal-pressure detection unit 10 as a power source.

Thereby, the central processing unit 13, to which the electric power is supplied while the electromagnetic wave at 100–300 KHz is received, which is transmitted from the monitor unit 20, performs information transmission processing programmed beforehand.

That is, the central processing unit 13 outputs the air pressure information, based on a signal outputted from inside the pneumatic sensor 14, and the own identification-information, stored in the memory unit 18, to the transmission unit 15. The transmission unit 15 modulates a carrier wave on the basis of the information inputted from the central processing unit 13, and supplies the modulated carrier wave or a high-frequency signal to the transmission and reception antenna 11.

Thereby, an electromagnetic wave of the second frequency or, an electromagnetic wave having the frequency of 300 MHz is radiated from the transmission and reception antenna 11.

On the other hand, the monitor unit 20 receives the electromagnetic wave at 300 MHz, which is radiated from the internal-pressure detection unit 10, with the reception unit 22 through the reception antenna 21; and the reception unit 22 converts the received information into digital data by the A/D converter 222, and transmits the digital data to the central processing unit 23.

The central processing unit 23 displays the information, which is based on the digital data and is inputted from the A/D converter 222 or the air pressure information and identification-information, which is received from the internal-pressure detection unit 10, on the display unit 25 in a one-to-one correspondence between them.

Therefore, according to the second embodiment, inherent identification-information is assigned to each internal-pressure detection unit 10, and hence, for example, if a plurality of fenders 1 are managed, it is possible to securely identify each air pressure of each fender 1.

Next, a third embodiment of the present invention will be described.

Figure 6:
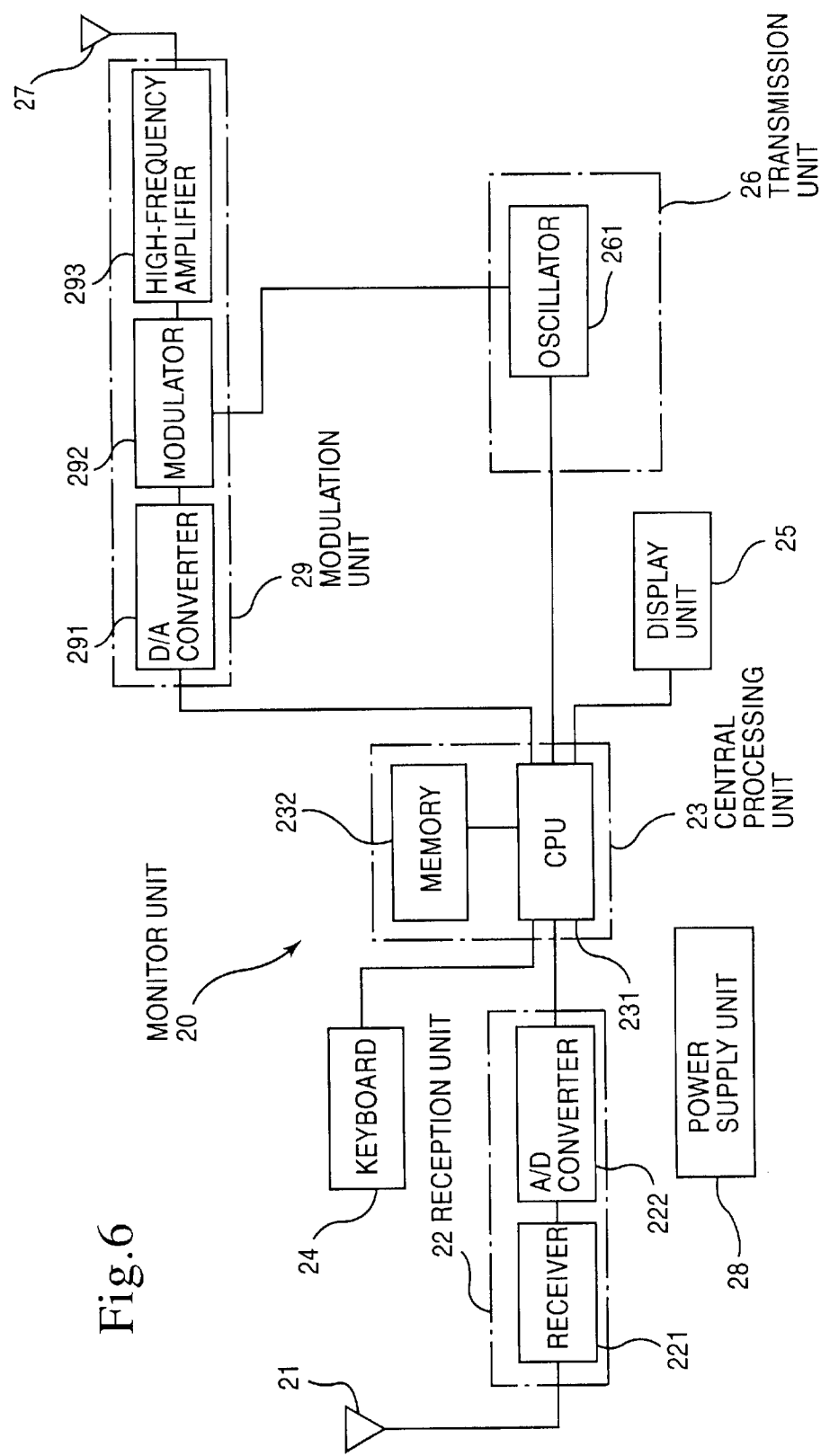
FIG. 6 is a block diagram showing an electric circuit of a monitor unit in a third embodiment of the present invention.

FIG. 6 is a block diagram showing an electric circuit of a monitor unit 20 in the third embodiment. In the drawing, the same components as those in the second embodiment are shown by the same symbols, land description thereof is omitted. In addition, difference between the second and third embodiments is that a modulation unit 29 is provided in the monitor unit 20 and the transfer of air pressure information can be performed by designating an internal-pressure detection unit 10.

That is, the modulation unit 29 is configured of a DIA converter 291, a modulator 292, and a high-frequency amplifier 293, and the input side of the D/A converter 291 is connected to the CPU 231 in the central processing unit 23; the output side is connected to the modulator 22.

The modulator 292 receives a carrier wave from the transmission unit 26, and modulates this with an output signal of the D/A converter 291 to supply this to the high-frequency amplifier 293.

The high-frequency amplifier 293 amplifies the high-frequency signal inputted from the modulator 292 and outputs the signal to the transmission antenna 27.

According to the internal-pressure detection apparatus having the configuration described above, not only identification-information of each internal-pressure detection unit 10 is transmitted at predetermined intervals on the basis of an operating program in the CPU 231 from the monitor unit 20 to the modulation unit 29, but also the transmission unit 26 is driven. Hence, the identification-information of each internal-pressure detection unit 10 is sequentially transmitted by the high-frequency signal of the first frequency or the high-frequency signal at 100–300 KHz from the transmission antenna 27.

This electromagnetic wave is inputted to the transmission and reception antenna 11 of the internal-pressure detection unit 10, and induces high-frequency current in the transmission and reception antenna 11.

The high-frequency current induced in the transmission and reception antenna 11 of the internal-pressure detection unit 10 passes through the low-pass filter 16a, and thereafter is rectified by the rectifier circuit 12 to be supplied to the central processing unit 13, pneumatic sensor 14, and transmission unit 15 inside the internal-pressure detection unit 10 as a power source.

Furthermore, in the internal-pressure detection unit 10, the central processing unit 13, to which the electric power is supplied while the electromagnetic wave at 100–300 KHz is received, which is transmitted from the monitor unit 20, decides the identification-information, inputted through the detection unit 17. If this identification-information matches with the own identification-information stored in the memory unit 18, the central processing unit 13 performs processing programmed beforehand.

That is, if the received identification-information matches with the own identification-information, the central processing unit 13 outputs the air pressure information, based on a signal outputted from inside the pneumatic sensor 14, to the transmission unit 15 and also reads the own identification-information stored in the memory unit 18 to output this identification-information to the transmission unit 15.

The transmission unit 15 modulates a carrier wave on the basis of the air pressure information and identification-information, which is inputted from the central processing unit 13, and supplies the modulated carrier wave or a high-frequency signal to the transmission and reception antenna 11. Thereby, an electromagnetic wave having the frequency of 300 MHz is radiated from the transmission and reception antenna 11.

On the other hand, the monitor unit 20 receives the electromagnetic wave at 300 MHz, which is radiated from the internal-pressure detection unit 10, by the reception unit 22 through the reception antenna 21.

The reception unit 22 converts the received information into digital data by the A/D converter 222, and transmits the digital data to the central processing unit 23.

The central processing unit 23 displays the information, which is based on the digital data inputted from the A/D converter 222, or the air pressure information and identification-information, which is received from the internal-pressure detection unit 10, on the display unit 25 in a one-to-one correspondence between them.

Therefore, according to the third embodiment, it is possible to transfer air pressure information by designating an individual internal-pressure detection unit 10. Hence, for example, if a plurality of fenders 1 are managed, information transmitted from respective fenders 1 may not be overlapped, and hence it is possible to securely identify and detect air pressure of each fender Next, a fourth embodiment of the present invention will be described.

Electric circuits of an internal-pressure detection unit 10 and a monitor unit 20 in the fourth embodiment are the same as those in the third embodiment. A difference between the third and fourth embodiments is that it becomes possible to write new information into memory unit 18 by designating an arbitrary internal-pressure detection unit 10.

That is, in case of obtaining air pressure information from an arbitrary internal-pressure detection unit 10, an air-pressure information transmission instruction, to which identification-information is added, is transmitted from the monitor unit 20.

An internal-pressure detection unit 10 having the identification-information corresponding to the identification-information of this instruction transmits the air pressure information and own identification-information to the monitor unit 20 according to the air-pressure information transmission instruction received.

In addition, when new information such as maintenance records is written into the memory unit 18 of an arbitrary internal-pressure detection unit 10, a monitoring person sets identification-information designating the internal-pressure detection unit 10, an information-write instruction, and information that is an object to be written, from the keyboard 24 on the monitor unit 20, and transmits these.

Thereby, a high-frequency signal based on the information-write instruction is supplied from the transmission unit 26 in the monitor unit 20 to the transmission antenna 27. An electromagnetic wave having a frequency of 100–300 KHz is radiated from the transmission antenna 27. This electromagnetic wave is inputted to the transmission and reception antenna 11 of the internal-pressure detection unit 10.

Thereby, while the internal-pressure detection unit 10 having the own identification-information that is the same as the identification-information designated by the monitor unit 20 receives the electromagnetic wave transmitted from the monitor unit 20, the central processing unit 13, to which electric power is supplied, performs processing, programmed beforehand, according to the information-write instruction inputted through the detection unit 17.

That is, when the information-write instruction is received, the central processing unit 13 of the internal-pressure detection unit 10 stores the information, which is an object to be written and is received along with the instruction, at a predetermined address of the memory unit 18. Thereby, the information stored in the internal-pressure detection unit 10 is updated.

In addition, when the information stored in the memory unit 18 of an arbitrary internal-pressure detection unit 10 is read, a monitoring person sets identification-information, designating the internal-pressure detection unit 10, and an information-read instruction from the keyboard 24 in the monitor unit 20, and transmits these.

Thereby, a high-frequency signal based on the information-read instruction is supplied from the transmission unit 26 in the monitor unit 20 to the transmission antenna 27. An electromagnetic wave having a frequency of 100–300 KHz is radiated from the transmission antenna 27. This electromagnetic wave is inputted to the transmission and reception antenna 11 of the internal-pressure detection unit 10.

Thereby, while the internal-pressure detection unit 10 having the own identification-information that is the same as the identification-information designated by the monitor unit 20 receives the electromagnetic wave transmitted from the monitor unit 20, the central processing unit 13, to which electric power is supplied, performs processing, programmed beforehand, according to the information-read instruction inputted through the detection unit 17.

That is, when the information-read instruction is received, the central processing unit 13 of the internal-pressure detection unit 10 reads the information, stored in the memory unit 18, and outputs this information with the own identification-information to the transmission unit 15.

The transmission unit 15 modulates a carrier wave on the basis of the information, which is read by the central processing unit 13, and supplies the modulated carrier wave or a high-frequency signal to the transmission and reception antenna 11. Thereby an electromagnetic wave having the frequency of 300 MHz is radiated from the transmission and reception antenna 11.

The monitor unit 20 receives the electromagnetic wave at 300 MHz, which is radiated from the internal-pressure detection unit 10, by the reception unit 22 through the reception antenna 21. The reception unit 22 converts the received information into digital data by the A/D converter 222, and transmits the digital data to the central processing unit 23.

The central processing unit 23 displays the information, which is based on the digital data inputted from the A/D converter 222, or the stored information and identification-information, which are received from the internal-pressure detection unit 10, on the display unit 25 in a one-to-one correspondence between them.

As described above, according to the fourth embodiment, it is possible to easily update or rewrite the information stored in the internal-pressure detection unit 10, and hence this may be effectively used if it is desired to hold and store maintenance history records or the like of a fender 1 in the fender 1 itself.

In addition, the configurations in the first though fourth embodiments are just exemplified, and hence the configurations of the present invention are not restricted by these.

Industrial Applicability

Electric energy for driving is supplied from a monitor unit to an internal-pressure detection unit, provided in a pneumatic fender, by an electromagnetic wave having a first frequency, and a detection result is transmitted from the internal-pressure detection unit to the monitor unit by an electromagnetic wave having a second frequency. Thereby, the internal-pressure detection unit is driven by the energy of the electromagnetic wave having the first frequency, and hence it is unnecessary to periodically replace a battery. Therefore, it is possible to greatly reduce the labor of maintenance. At the same, time, since it is unnecessary to install cables between the pneumatic fender and a monitoring station provided with the monitor unit, it is possible to omit the labor of installing the cables. In addition, if a plurality of pneumatic fenders, which are objects to be managed, exists, it is possible to securely identify each internal air pressure to each fender by assigning identification-information inherent in an internal-pressure detection unit of each fender. Furthermore, it is possible to obtain a detection result of air pressure by designating a specific internal-pressure detection unit by identification-information. Moreover, by providing means of information memory in an internal-pressure detection unit and allowing the fender itself to store and hold information such as maintenance history records of the fender, it is possible to easily access this information as the need arises.

FIG. 1

1 pneumatic fender
2 Quay
3 Bridge Pier
4 Monitoring Station
10 Internal-pressure detection unit
20 monitor unit

FIG. 2

1 Pneumatic fender
1a Filler hole
10 Internal-pressure detection unit

FIG. 3

10 Internal-pressure detection unit
11 Transmission and reception antenna
12 Rectifier circuit
13 Central processing unit
14 Pneumatic sensor
15 Transmission unit
16 Duplexer
132 D/A converter
151 Oscillator
152 Modulator
153 High-frequency amplifier

FIG. 4

20 Monitor unit
22 Reception unit
23 Central processing unit
24 Keyboard
25 Display unit
26 Transmission unit
28 Power supply unit
221 Receiver
222 A/D converter
323 Memory
261 Transmitter

FIG. 5

10 Internal-pressure detection unit
11 Transmission and reception antenna
12 Rectifier circuit
13 Central processing unit
14 Pneumatic sensor
15 Transmission unit
16 Duplexer
17 Detection unit
18 Memory unit
132 D/A converter
151 Oscillator
152 Modulator
153 High-frequency amplifier
173 A/D converter

FIG. 6

20 Monitor unit
22 Reception unit
24 Keyboard
221 Receiver
222 A/D converter
28 Power supply unit
232 Memory
23 Central processing unit
25 Display unit
26 Transmission unit
261 Transmitter
292 D/A converter
293 Modulator
29 High-frequency amplifier
Modulation unit

What is claimed is:

1. An internal-pressure detection apparatus for a pneumatic fender that is fixed to an underwater structure or floated and is used as cushioning material for a ship or the like, comprising:
an internal-pressure detection unit provided in the pneumatic fender; and
a monitor unit installed in a predetermined internal-pressure monitoring station,
wherein the internal-pressure detection unit comprises:
a pneumatic sensor that detects air pressure inside the pneumatic fender and outputs an electric signal corresponding to a value of the air pressure;
means of reception for receiving an electromagnetic wave having a first frequency;
means of energy conversion for converting energy of the electromagnetic wave, received by the means of reception, into electric energy; and
means of transmission for operating by the converted electric energy, inputting an electric signal outputted from the pneumatic sensor, and transmitting a detection result of the internal air pressure by an electromagnetic wave having a second frequency;
means of identification-information memory for storing identification-information inherent in each internal-pressure detection unit;
means of identification-information extraction for extracting the identification-information included in a high-frequency signal received by the means of reception;
means of identification-information matching decision for deciding matching the identification-information, extracted by the means of identification-information extraction, to the identification-information stored in the means of identification-information memory;
means of transmission drive control for driving the means of transmission when matching according to the decision result;
means of instruction extraction for extracting an information-read instruction and an information-write instruction which are included in a high-frequency signal received by the means of reception;
means of information memory; for storing information about the pneumatic fender
means of information write for writing information including updated information and additional information, which is an object to be written and follows the information-write instruction into the means of information memory when matching according to a decision result of means of the identification-information matching decision and receiving the information-write instruction;
the means of information read for reading information, which is stored in the means of information memory, when matching according to a decision result of means of the identification-information matching decision and receiving the information-read instruction; and the means of transmission for transmitting the detection result of internal air pressure by the pneumatic sensor further comprising means for transmitting identification-information stored in the means of identification-information memory, and information which is read by the means of information read by the electromagnetic wave having the second frequency; and wherein the monitor unit comprises:

means of transmission for transmitting the electromagnetic wave having the first frequency;

means of reception for receiving the electromagnetic wave having the second frequency and converting the electromagnetic wave into an electric signal;

means of detection result extraction for extracting a detection result of the internal air pressure, which is included in the electric signal outputted from the means of reception; and means of information for informing of the detection result extracted by the means, of detection result extraction;

the means of memory for storing identification-information of the internal-pressure detection unit provided in the pneumatic fender that is an object to be detected;

means of instruction input for inputting an information-write instruction and information, which is an object to be written, to means of information memory in the internal-pressure detection unit, and an information-read instruction from the means of information memory;

means of transmission including means for transmitting, identification-information of the internal-pressure detection unit that is stored in the means of memory, and the instructions, which are inputted by the means of instruction input, and information that is an object to be written by the electromagnetic wave having the first frequency;

means of information extraction for extracting information that is stored in the internal-pressure detection unit and is included in an electric signal outputted from the means of reception;

the means of detection result extraction for extracting the detection result of internal air pressure including means for extracting identification-information from an electric signal outputted from the means of reception; and the means of information for informing of a detection result, which is extracted by the means of detection result extraction including means for informing information, which is extracted by the means of information extraction, which are corresponding to identification-information extracted by the means of detection result extraction.

2. The internal-pressure detection apparatus for a pneumatic fender according to claim 1, wherein the means of information informs the identification-information and detection results that are extracted by the means of detection result extraction in a one-to-one correspondence between them.

3. The internal-pressure detection apparatus for a pneumatic fender according to claim 1, wherein the means of information memory contains maintenance history records of the pneumatic fender.

* * * * *